United States Patent
Gorjanc et al.

(10) Patent No.: US 8,893,561 B2
(45) Date of Patent: Nov. 25, 2014

(54) DIELECTRIC TEXTURED ELASTOMER IN A PRESSURE MAPPING SYSTEM

(75) Inventors: Timothy Carl Gorjanc, Calgary (CA); Ian Main, Calgary (CA); Dave Jack, Calgary (CA)

(73) Assignee: XSENSOR Technology Corporation, Calgary (CA)

( * ) Notice: Subject to any disclaimer, the term of this patent is extended or adjusted under 35 U.S.C. 154(b) by 84 days.

(21) Appl. No.: 13/480,406

(22) Filed: May 24, 2012

(65) Prior Publication Data
US 2012/0272751 A1    Nov. 1, 2012

Related U.S. Application Data

(63) Continuation-in-part of application No. 12/436,713, filed on May 6, 2009, now Pat. No. 8,272,276.

(51) Int. Cl.
*G01D 7/00* (2006.01)
*G01L 1/14* (2006.01)

(52) U.S. Cl.
CPC .................... *G01L 1/146* (2013.01)
USPC ......................................... 73/862.046

(58) Field of Classification Search
USPC .................... 73/862.041–862.046
See application file for complete search history.

(56) References Cited

U.S. PATENT DOCUMENTS

| | | | |
|---|---|---|---|
| 7,580,030 B2 * | 8/2009 | Marten | 345/173 |
| 8,272,276 B2 * | 9/2012 | Gorjanc et al. | 73/862.046 |
| 2002/0155728 A1 * | 10/2002 | Khandros et al. | 438/773 |
| 2007/0069642 A1 * | 3/2007 | Kitai et al. | 313/511 |
| 2007/0257821 A1 * | 11/2007 | Son et al. | 341/22 |
| 2008/0180390 A1 * | 7/2008 | Yoshikawa | 345/156 |

* cited by examiner

*Primary Examiner* — Max Noori
(74) *Attorney, Agent, or Firm* — Fenwick & West LLP

(57) ABSTRACT

A capacitance pressure mapping system includes a plurality of sensor cells created by the intersection of electrode columns and rows, and a solid elastomer dielectric separating the electrode columns and rows. The elastomer is at least one planar sheet having a surface comprising a pattern of projections. The pattern of projections may include two or more different types of projections, for example projections of different shapes (geometries) and/or sizes (height, width).

29 Claims, 6 Drawing Sheets

DIELECTRIC TEXTURED ELASTOMER IN A PRESSURE MAPPING SYSTEM

CROSS-REFERENCE TO RELATED APPLICATION(S)

This application is a continuation-in-part of U.S. patent application Ser. No. 12/436,713, "Dielectric Textured Elastomer in a Pressure Mapping System," filed May 6, 2009. The subject matter of the foregoing is incorporated herein by reference in its entirety.

FIELD OF THE INVENTION

The present invention is directed to a textured dielectric elastomer in a pressure mapping system.

BACKGROUND

One class of pressure mapping systems are based on a matrix of capacitors in which a thin, flexible elastomer is used as the dielectric. When pressure is applied to the capacitor, the dielectric material is compressed and the capacitance changes. The sensing mechanism of the sensor depends on two main factors: the mechanical properties and the geometry of the elastomer. Both of these properties determine the performance and stability of the sensor, including characteristics such as creep, compression set, and hysteresis.

To generate a pressure map, an array of m rows and n columns of conductive strips are separated by a thin compressible elastomer. This creates an m×n array of sensor elements which are rastered to generate a map of the pressure distribution. An electrical signal is applied to the rows, and the attenuated signal is detected from the columns. The pressure applied to any individual sensor element will compress the elastomer and increase the capacitance of the element, thus increasing (or otherwise changing) the detected signal strength. The signal strength is correlated to a pressure value through a process of calibration. All adjacent rows and columns are switched to electrical ground to reduce interference between contiguous sensor elements. It may be assumed that each sensor element is an independent entity and that an applied pressure on one sensor element does not affect the output of another sensor element.

The elastomer is conventionally a foam material, or a solid, non-foam sheet.

Foams are classified as either open or closed cell. In the open cell structure, the cells (air pockets) are interconnected while in the closed cell structure there is a predominance of non-interconnecting cells. Closed cell foams typically have higher compressive strength due to their structures and are also generally denser and heavier than open cell foams. Foams are extremely lightweight and flexible compared to non-foam dielectric elastomers and can be very sensitive to low applied pressures.

Unfortunately, one of the largest drawbacks to foams is the inherent random nature of the cell structure. The cell structure can be the source of substantial drift and inaccuracy due to continuous or cyclic loading, which is characteristic of both open and closed cell foams. The rebound of foam when pressure is decreased tends to be much slower than a solid elastomer due to the fact that air (or some other gas) needs to re-enter the foam to prevent a vacuum from forming within the cells. Slower response time and greater compression set make it difficult to detect dynamically changing loads accurately. A sensor using foam may experience inaccuracies such as a lack of repeatability due to the inconsistency of the film, unpredictable deformation, and mechanical instability. These factors create problems when foam is used in a capacitive pressure sensor.

Solid elastomer dielectrics improve some of the issues that the use of foam presents. The simplest way to employ a solid elastomer as the dielectric is via a uniform solid sheet. The hardness of the elastomer will have a large impact on the physical properties of the final film. A low durometer elastomer will be softer, more flexible, and have a higher sensitivity at low pressures compared to a high durometer elastomer, but will exhibit more measurement creep at high pressures and have a lower maximum pressure limit. The chemistry of the elastomer will also affect the final physical properties such as tear resistance. When compared to foam, solid elastomers will typically have a higher density and will be heavier, but may have comparable flexibility.

If a solid sheet elastomer is compressed under a single point load, the sheet will be compressed in the region under the applied force. Depending on the material composition, the depression can be localized or may spread radially outwards. If there are multiple compression points that are in close proximity, the deformation of the elastomer in the vicinity of each depression can be unpredictable and leads to buckling of the sheet or an increase in thickness, which is the primary problem with using a solid sheet. This is due in part because when the solid sheet is compressed, there is no empty space for the compressed material to expand into without distorting the surrounding uncompressed material.

A solid sheet is also less compressible and will reach its maximum compression quickly and will thus saturate the sensor. Therefore, solid sheets are less sensitive to changes in pressure.

Thus, there is a need for improved pressure mapping systems.

BRIEF DESCRIPTION OF THE DRAWINGS

The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 10(*a*) is an example of a pattern of projections consisting of two different projection sizes. FIG. 10(*b*) are side, top and perspective views of the pattern shown in FIG. 10(*a*).

DETAILED DESCRIPTION OF PREFERRED EMBODIMENTS

Pressure mapping systems comprise flexible, patterned solid sheet elastomer dielectrics. In one aspect, a pressure mapping system includes a plurality of sensor cells created by the intersection of electrode columns and rows, and a textured elastomer dielectric separating the electrode columns and rows and comprising at least one planar sheet having two major surfaces, wherein at least one major surface comprises a pattern of projections. The projections may comprise single point projections and the pattern of projections comprises a plurality of rows, columns, or more complex pattern.

In one embodiment, the dielectric may be comprised of a pattern of projections on a planar sheet consisting of two or more types of projections of varying dimensions and/or geometry (shapes), the projections being arranged in patterns that group or separate projections of the same type.

In one embodiment, each single point projection has a planar cross-sectional shape comprising a circle, an oval, a quadrilateral, a triangle, or other geometric or irregular shape. In another aspect, each single point projection has a vertical cross-sectional shape comprising a square, a rectangle, a trapezoid, a semi-circle, a semi-oval, a triangle or other geometric or irregular shape.

In one embodiment, the planar sheet is comprised of a different elastomer than the pattern of projections. The planar sheet elastomer has different mechanical and/or chemical properties.

In one embodiment, the planar sheet and pattern of projections are made of flexible elastomer materials, or other flexible or compressible materials including but not limited to, plastics, rubbers, foams, encapsulated fluid cells, urethanes, cellular urethane, polyurethanes, polyester copolymers, olefinics, and styrenic elastomers.

When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

| | |
|---|---|
| Column | When using a row-column architecture, a Column refers to the conductor(s) that carry an electrical signal from the electronics to the Sensor Cell. |
| Compression Set | The permanent deformation remaining after release of a compressive stress. |
| Creep | The slow deformation of an object resulting from constant pressure applied over long periods of time. |
| Dielectric | A non-conducting substance, when referring to a material. |
| Durometer | A method to express the hardness of a material. The typically used durometer scale for elastomers is the Shore A scale. |
| Elastomer | A material with elastic properties. |
| Hysteresis | A property of some elastomers where the strain due to a given stress is larger when the stress is decreasing than when it is increasing. |
| Row | When using a row-column architecture, a Row refers to the conductor(s) that carry an electrical signal from the Sensor Cell to the measurement electronics. |
| Sensor | The device that contains individual Sensor Cells that deform under pressure thus causing changes in the Sensor Cell's internal capacitive coupling that can be measured by an external electronic device. |
| Sensor Cell | The individual device used to measure pressure through changes in capacitance. In a row-column architecture, the Sensor Cell is formed by the intersection of a Row and a Column, which capacitive coupling changes under pressure. The Sensor Cells are typically arranged in rows and columns within a Sensor. |

Pressure Mapping.

Figure 1:
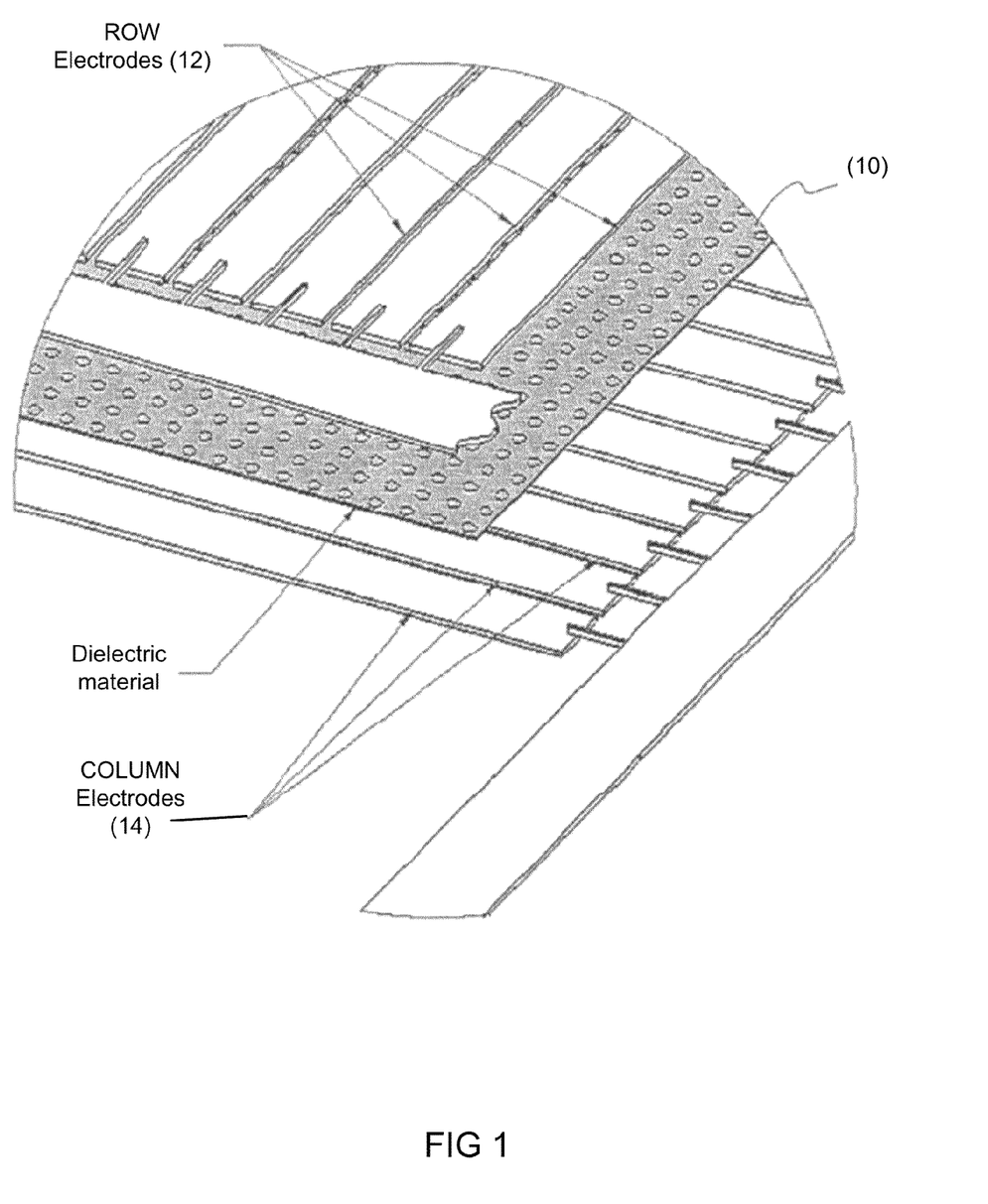
FIG. 1 shows a schematic of a portion of a sensor for a pressure mapping system.

FIG. 1 shows a schematic of a portion of an example pressure mapping system. The pressure mapping system comprises a matrix of capacitors in which a thin, flexible elastomer is used as the dielectric (10). The dielectric material between the flexible electrodes is the active sensing element. As pressure is applied to the sensor, the dielectric material will compress thereby decreasing the spacing between the flexible plates of the capacitor resulting in an increase in the capacitance.

To generate a pressure map, an array of m rows (12) and n columns (14) of flexible conductive strips are separated by the dielectric (10). This creates an m×n array of sensor elements which are rastered to generate a map of the pressure distribution. In one approach, an electrical signal is applied sequentially to each row (12), and the attenuated signal is detected sequentially from each column (14). A sensor element or cell is created at each intersection of the rows and columns. The pressure applied to any individual sensor cell will compress the elastomer (10), and increase the capacitance of the cell, thus increasing the detected signal strength. The signal strength is correlated to a pressure value through a process of calibration. In one embodiment, all adjacent rows and columns are switched to electrical ground to reduce interference between contiguous sensor cells. In the following, it is assumed that each sensor cell is an independent entity and that an applied pressure on one sensor cell does not affect the output of another sensor cell (although this is not strictly required).

Each sensor cell can be considered to be a parallel plate capacitor where the capacitance is given by:

$$C = \frac{\varepsilon_r \varepsilon_o A}{d} \quad (1)$$

where $\varepsilon_r$ and $\varepsilon_o$ are the relative permittivity of the elastomer material and vacuum permittivity, respectively, A is the area of the sensor element which is defined by the overlap area between the row and column flexible electrodes, and d is the separation of the row and column electrodes in the sensor element, the separation being the thickness of the elastomer. A measurement technique indirectly measures the change in separation of the two electrodes using the subsequent change in capacitance that can be correlated to a change in pressure by an appropriate calibration method.

The area, A, of each sensor cell can vary widely depending on the sensor application. For example, high resolution sensor cells can have sensing areas as small as 0.005"×0.005". In a low resolution example, a sensor cell can be 1.25"×1.25" or larger. In another example, low resolution sensors for sleep market applications can have sensor cells with areas in the range of 1"×1" to 2"×2". In another example, medical sensors can have sensor cells with areas in the range of 0.25"×0.25" to 0.75"×0.75". In another example, high resolution industrial sensors can have sensing cells with areas in the range of 0.050"×0.050" to 0.2"×0.2". In other examples, the sensing cells may be of similar dimensions but of other geometric shapes such as rectangular, circular, or elliptical. Therefore, there is a wide range of sensor cell sizes to be supported by the elastomer design. For many applications, the sensor is flexible, for example to conform to a person's body weight.

The elastomer thickness, d, including projections, preferably is thin to increase the flexibility of the sensor. In some applications, the sensor must be capable of conforming around very small features in the surface that is being pressure mapped. For example, for many applications, an elastomer thickness d of not more than 0.050" or more preferably not more than 0.025" can provide adequate flexibility while supporting a wide range of pressure measurements. For example, the elastomer thickness can range from very thick, 0.2" to 0.05", for high pressure industrial applications, to very thin, 0.025" to 0.002" for low pressure sensing applications. The range of pressure measurements supported by the sensor is dependent on the elastomer thickness as well as the mechanical properties of the elastomer. Elastomer thickness can be varied to support different applications. For example, sleep market applications can have a pressure measurement range of 5 mmHg to 50 mmHg or more preferably 10 mmHg to 100 mmHg. In another example, medical sensors have pressure ranges of 5 mmHg to 250 mmHg or more preferably 5 mmHg to 200 mmHg. In another example, industrial sensors have pressures ranges of 0.1 PSI to 15 PSI, 1 PSI to 50 PSI, or 10 PSI to 200 PSI depending upon the application.

As the thickness of the elastomer decreases under applied pressure, the capacitance of the sensor cell increases and the attenuation of the injected electrical signal will decrease. The resulting electrical signal can be measured and calibrated to known applied pressures.

Pressure mapping sensors contain an array of sensor cells and can be designed to support a wide variety of applications. The array of sensor cells can cover sensing areas as small as 0.5"×0.5", or less, and sensing areas as large as 6'×6', or greater. In another example, seat sensors can have a sensing area in the range of 12"×12" to 24"×24", or more preferably 18"×18". In another example, bed sensors can have a sensing area in the range of 28"×72" to 40"×96", or more preferably 32.5"×80". In another example, medical bed and stretcher sensors can have a sensing area in the range of 24"×72" to 36"×84", or more preferably 30"×73.75". In another example, an industrial tire sensor can have a sensing area of 11.6"× 11.6" or 16"×16" or 3'×3' depending upon the application. In another example, a spot sensor can be 0.25"×0.25", or preferably 0.5"×0.5", or more preferably 1"×1". In another example, a windshield wiper sensor can have a sensing area of 24"×0.25" to 40"×1", or more preferably 32"×0.5". Therefore, if a common design is used, the elastomer sheet should be a scalable from very small dimensions to very large dimensions, as described in the previous examples.

Behaviour of Dielectric Materials.

In an idealized sensor, the dielectric material is assumed to compress linearly over the entire pressure range and the compression/decompression behavior is consistent regardless of the loading/unloading sequence. In a real sensor, the response of the dielectric can vary from mildly non-linear to highly non-linear. Typically, the response is linear and obeys Hooke's Law at lower pressures and becomes non-linear as the pressure is increased. The total amount of compression that the dielectric material will experience defines the dynamic range of the sensor and thus the usable range of measurement and sensitivity. The dynamic range is defined as the range of dielectric material thickness from an unloaded material to maximum load where the material cannot compress any further. Additionally, other physical phenomena such as creep, hysteresis, and compression set will affect how the material reacts to pressure and thus the overall performance and accuracy of the sensor.

Figure 2:
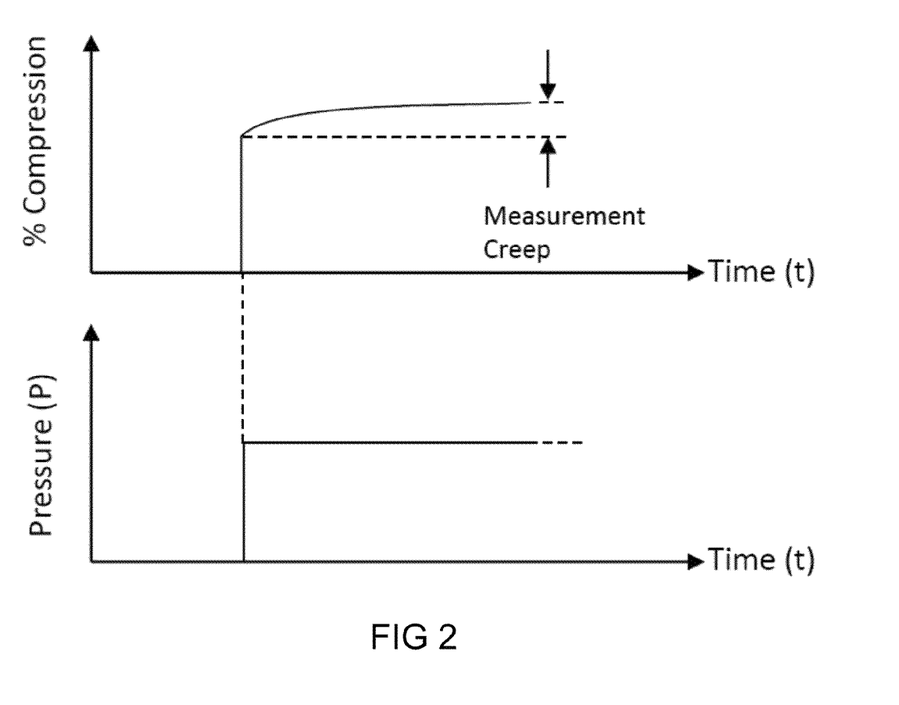
FIG. 2 illustrates a typical compression versus applied pressure response curve for a foam or textured elastomer sheet.

Creep is defined as the time-dependent change in strain following a step change in pressure. For example, if pressure is applied to a viscoelastic dielectric material there will be an immediate elastic compression that is characteristic of the material, followed by delayed elastic deformation and Newtonian flow. If the pressure is maintained over a period of time, the material will continue to compress. The rate of compression may slow over time but will continue to compress over many hours. FIG. 2 provides an example of a pressure versus compression curve typical of a commonly used foam dielectric material.

Under extremely high pressures it is possible for the material to not return to its original state and remain slightly compressed when the pressure is removed. This phenomenon is known as compression set. When compression set occurs, the internal structure is partially or completely altered and will no longer return to its original state. The point at which permanent deformation occurs defines the maximum pressure that can be applied to the sensor without permanently damaging it.

A dielectric material also has a characteristic response to increasing and decreasing pressure. The variation in elastic response due to loading and unloading of pressure is commonly referred to as hysteresis. Hysteresis can be minimized by ensuring that dielectric material remains within the linear elastic region during compression. When foam is used as the dielectric material, hysteresis is exaggerated due to the slow recovery of the cells in the foam to their original shape.

Another important concept is the Boltzmann superposition principle which states that the creep is a function of the entire past loading history of the sample and that the total deformation is the sum of all of the individual deformations from the previous loading steps. This implies that, regardless of the type of dielectric material used, the past loading and unloading history of a sensor will impact current measurements and that a sensor will have an intrinsic reset time to erase the previous loading history. Simply put, if pressure is applied to a dielectric material in a cyclical pattern then the measurement accuracy will decrease if the cycles are too short to allow for recovery of the material. In foam-based sensors, this recovery time is much longer than that of a textured solid elastomer.

Textured Elastomer Performance Improvements

An ideal dielectric material would not exhibit any creep, compression set, hysteresis or delays in response to variations in applied pressure. A textured dielectric elastomer is still subject to these material characteristics but significantly reduces their impact on measurement accuracy in comparison to commonly used foam dielectric materials in pressure mapping systems.

A textured elastomer can significantly reduce compression creep compared to a foam dielectric which allows measurement accuracy to be maintained over long periods of time. Commonly used foam dielectric materials may be suitable for static and quasi-static test and measurement applications where pressure is applied and a measurement is taken within a short time (i.e. less than 30 minutes). For continuous monitoring applications, however, compression creep must be reduced significantly or the pressure measurement will quickly drift beyond the required accuracy specification.

A textured elastomer reduces hysteresis, has a faster recovery from compression, and is less susceptible to compression set. This provides improved performance in applications where pressure loading is uncontrolled, quickly changing and subject to pressures approaching the maximum recommended for the material. Under controlled test and measurement conditions it may be possible to allow the dielectric material to recover before applying new pressure but in uncontrolled continuous monitoring applications such conditions cannot be guaranteed. A textured elastomer provides greater measurement accuracy under random loading conditions common to both continuous monitoring and test and measurement environments.

Example Textured Elastomer Sensors and Sensor Cells

In one embodiment, the hardness range of the patterned elastomer may be chosen based on several criteria: what the minimum and maximum pressure will be and how much creep and hysteresis will be permitted. All of these factors are interrelated. For example, a soft elastomer with a 5 to 30 Shore A hardness will be suitable for low pressure applications due to the easy deformation of the material, but may exhibit unacceptable amounts of creep at higher pressures. Conversely, an elastomer with a 50 to 70 Shore A hardness might have poor low pressure performance due to the inability of the elastomer to deform under low pressure, but will be able to operate at higher pressures with less creep.

The elastomer may comprise a natural rubber such as latex or a synthetic rubber such as ethylene propylene diene (EPDM), polyurethane, polybutadiene, or polysiloxane. The only limitation to material selection is that the material can be processed into the desired shape and that the material has favourable mechanical properties. In one embodiment, the hardness range for a suitable elastomer is 30-70 Shore A. In another embodiment, the hardness for a suitable elastomer is 1 to 10 Shore A. In another embodiment, the hardness for a suitable elastomer is 10 to 30 shore A.

In one embodiment, the dielectric elastomer (10) comprises a plurality of evenly spaced discrete projections. Each projection is aligned with a sensor cell created by the intersection of a column and a row in the sensing area. In one embodiment, each sensor cell comprises at least one projection, and may comprise a plurality of projections. An elastomer sheet with a pattern of spaced discrete projections is said to be textured or patterned.

Figure 3:
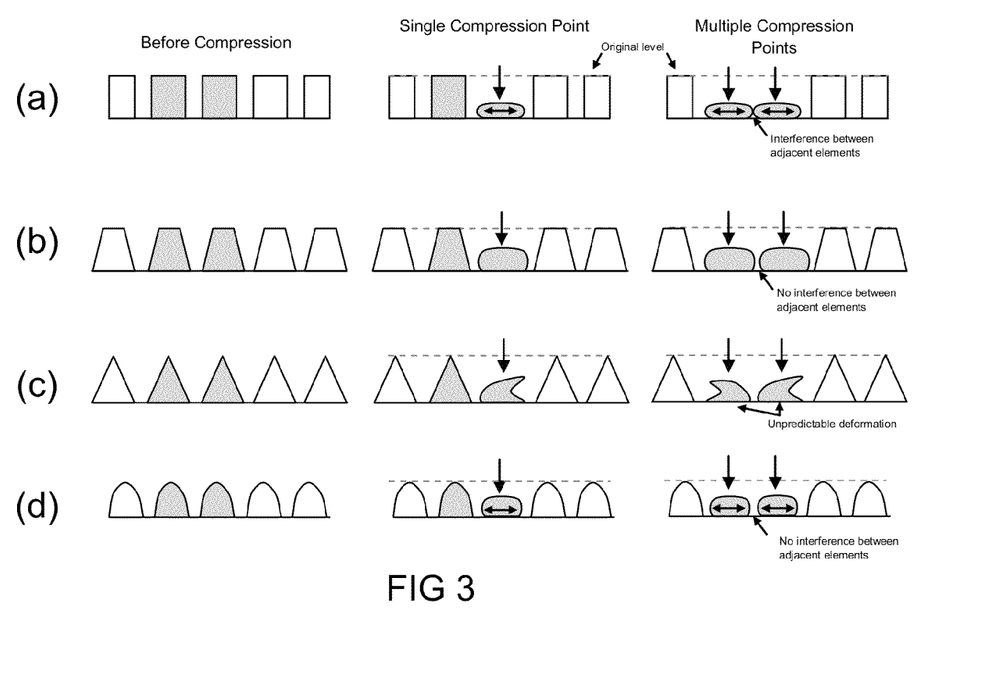
FIG. 3 are cross-sectional views that illustrate the effect of (a) cylindrical, (b) trapezoidal, (c) conical, and (d) domed projections and their behavior when a compressive force is applied. The small arrows within the elastomer (shaded portion) illustrate the direction of deformation.

The space between the projections provides a void space which the compressed material may expand into. These discrete projections may take on various shapes defined by its planar cross-sectional shape (parallel to the major surface of the dielectric) and its vertical cross-sectional shape (perpendicular to the major surface). The planar cross-sectional shape may comprise a circle, an oval, a quadrilateral, a triangle, or an irregular shape. The vertical cross-sectional shape may comprise a square, a rectangle, a trapezoid, a semi-circle, a semi-oval, a triangle or an irregular shape. Various exemplary vertical cross-sectional shapes are shown in FIG. 3. A single compression point on one of the rectangular projections, for example, will result in "perfect" compression with the sidewalls bulging outwards normal to the applied force as per Poisson's ratio.

Three issues to consider when designing a patterned elastomer are mechanical interference, mechanical stability, and predictable deformation.

If the projections are spaced too close together then there will be mechanical interference between adjacent projections when the dielectric film is compressed (shown in FIG. 3). By having mechanical interference between adjacent projections, the deformation of the projections under compression can be restricted in certain directions and can be unpredictable. Conversely, spacing the projections too far apart in an effort to prevent any physical interaction between adjacent projections may result in a loss of spatial resolution of the sensor.

In one embodiment, the discrete projections each comprise a variable geometry to provide more resistance to compression as the applied force is increased. These structures comprise a decreasing planar cross-sectional area, and may include trapezoidal, hemi-spherical (domed), triangular (conical or pyramical) vertical cross-sections. Such variable geometry will give more stability, strength, and resistance to creep than a rectangular columnar structure (see FIG. 3). By designing the projection with a decreasing planar cross-sectional area, the projection becomes more stable and deformation of the projection should be more predictable with applied pressure.

Regardless of the geometry of the projections, the projection spacing helps define the maximum load limit that the sensor can detect. If the load is large enough to create mechanical interference between adjacent projections, then pressure measurements at or above that applied load cannot be reliable.

Figure 4:
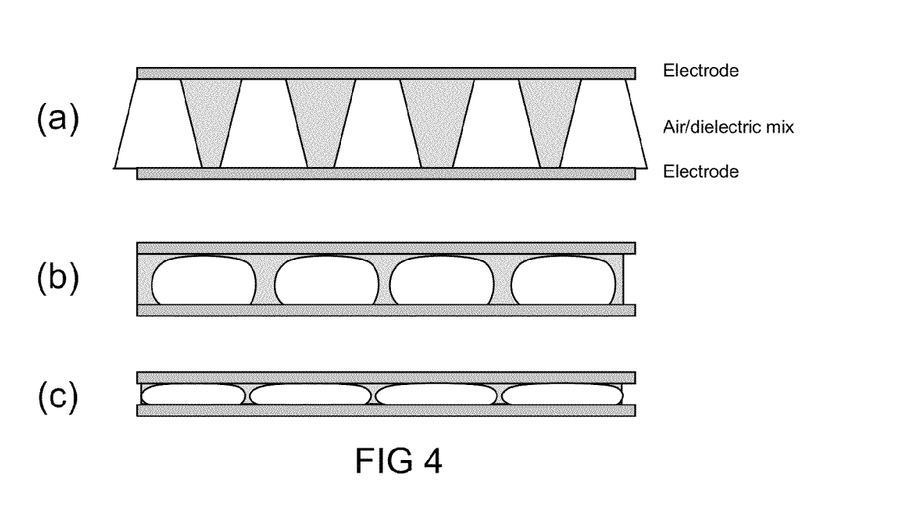
FIG. 4 are cross-sectional views that illustrate how the air/dielectric ratio changes under (a) no compression, (b) moderate compression, and (c) extreme compression. The effective dielectric constant will be a combination of the dielectric constant of the elastomer (clear) and air (shaded).

Another characteristic feature influencing geometric spacing is the effective dielectric constant of the sensing layer. Since the sensor operates under ambient conditions, the dielectric constant of the capacitor is a combination of the elastomer dielectric constant and that of the air surrounding the projections, as illustrated in FIG. 4. As the sensor is compressed, the projections compress and air is forced out of the sensor. As higher loads are applied, more air is forced out and the dielectric constant shifts more towards that of the elastomer (i.e. higher value).

Another design issue is related to the mechanical stability of the projections and their aspect ratios. An projection which has a column-like profile with a height to width aspect ratio of 0.5 (a cube) will be very stable when compressed and give predictable deformation. When the aspect ratio is increased the projection begins to resemble a tall and narrow column, which is not as stable when a load is applied. In this case, there will be unpredictable buckling of the column, which creates a discontinuity in the sensor output as well as creating a non-linear response to applied pressure. This means that a sensor will not have a high level of repeatability and can give unpredictable pressure measurements. In the case of a triangular geometry with a very narrow top, as shown in FIG. 3, there is no predictable direction that the triangular projection will shift to when a compressive load is applied. In addition to the buckling, the projection will begin to fold over on itself.

Trapezoidal (with a tapered width and a non-pointed top) or domed projections are more stable and provide predictable and repeatable deformation without buckling or folding. By having projections that have predictable deformation, the sensor becomes more accurate and the measurements become more repeatable. The deformation of the projections can be modelled mathematically to correct and compensate for creep and hysteresis.

Figure 5:
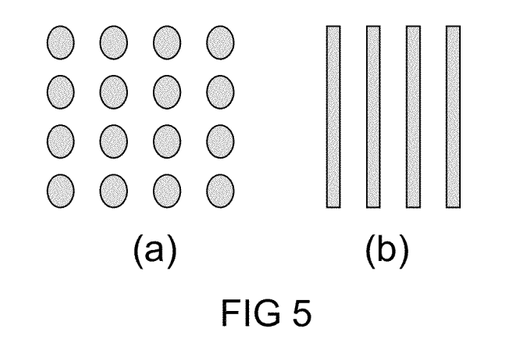
FIG. 5 is a top view of a textured elastomer based on (a) point projections, and (b) line projections.

In one embodiment, the discrete projections may comprise single points or lines. Single points may have regular or variable shapes as described above. Lines may have profiles which are rectangular, square, trapezoidal, or curved. Exemplary domed points and rectangular lines are shown in FIG. 5.

The planar elastomeric dielectric may be used in single or multi-layer sheets. A single sheet with single points will typically be lighter and more flexible than a single sheet consisting of lines (with the same spacing and cross-sectional shape).

Figure 6:
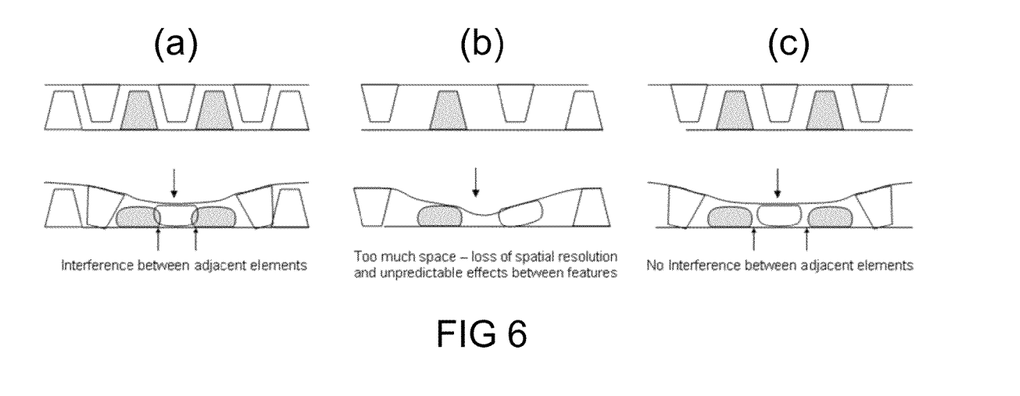
FIG. 6 are cross-sectional views that show two interlocked textured elastomer sheets with (a) close, (b) far, and (c) optimized spacing.

A multi-layer dielectric may include two or more sheets. In one embodiment, the dielectric comprises a pair of opposing sheets. The use of multi-layers may increase the operating pressure range as well as reduce other effects such as creep and hysteresis. The opposing pair of sheets may be aligned so the projections are interlocking. Alternately, they may be corresponding. If interlocking, the projections fit in between the opposing projections as shown in FIG. 6. If corresponding, the projections partially or entirely overlap with the opposing projections. If the projections are interlocking, mechanical interference issues must be considered when choosing the dimensions of the projections and their spacing. In this configuration, the overall thickness of the two layers is only marginally higher than the single layer.

In another embodiment, the pair of opposing sheets each comprise a line configuration, where the two sets of lines are at an angle to each other. It is convenient to dispose the lines at right angles to the opposing lines. As with the other configurations, mechanical interference must be considered and the geometry and spacing are chosen having the sensor properties and intended uses in mind.

Elastomer Material Selection.

In the examples described above, the textured elastomer is often described as a planar sheet of a single elastomer material. For a design based on a single elastomer, the elastomer must be soft enough to support low pressure sensitivity but hard enough to effectively measure higher pressures. A harder elastomer is also more resistant to tearing and therefore is a more rugged and long lasting material. When a dielectric material is constructed from a single elastomer, an elastomer with a hardness in the range of 25 to 55 Shore A (durometer) will provide an adequate combination of low end sensitivity, pressure range, and durability for certain applications.

Figure 7:
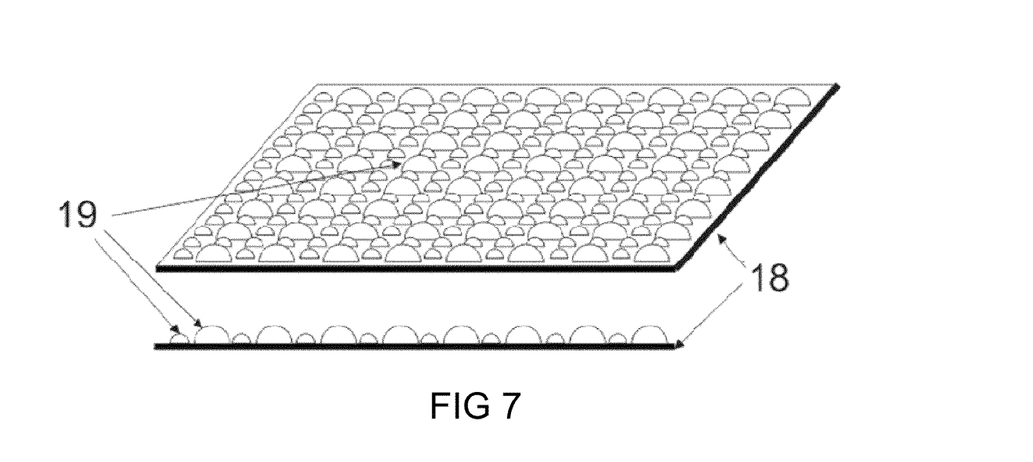
FIG. 7 is a cross sectional view of a textured dielectric sheet using two elastomers.

In an alternate embodiment, the textured elastomer includes one or more elastomers selected to optimize the performance of the planar sheet as a whole. In one embodiment, the elastomer is a planar sheet of material having two major surfaces, wherein at least one major surface comprises a pattern of projections. As shown in FIG. 7, the elastomer has a thin backing layer (18) and a layer of projections (19). The backing layer and the projection layer can be constructed with different dielectric materials to improve the performance of the sensor.

In one embodiment the backing layer is constructed with an elastomer that is harder and has greater elasticity than the elastomer used to construct the projection layer. For example, the backing layer elastomer can have a hardness of 5 Shore A to 50 Shore A, or more preferably 8 Shore A to 25 Shore A, while the projection layer has a hardness of less than the backing layer. By using a backing layer elastomer that is more robust, the planar sheet is resistant to tearing and thereby achieves an acceptable degree of ruggedness. By using a projection layer elastomer that is softer, the dielectric elastomer becomes much more sensitive to lower pressure.

The use of different elastomers for planar sheet's backing layer and projection layer permits the use of softer elastomers for the projections and harder elastomers for the backing layer. This achieves a construction that can be optimized for increased pressure sensitivity, flexibility, durability and ruggedness.

In another embodiment, various elastomer materials of different hardness and elasticity can be chosen to optimize the sensor for specific applications. For example, projections can be constructed of different elastomer materials to achieve an overall combination of low pressure sensitivity and the ability to measure higher pressures. In another example, the projections can be constructed of different elastomers in different regions of the sensor, or the backing layer can consist of different elastomers in different regions of the sensor, to provide application specific sensing characteristics.

In another embodiment the dielectric material consists of a combination of elastomers or other materials such as foams, plastics, rubbers, encapsulated fluid cells, urethanes, cellular urethane, polyurethanes, polyester copolymers, olefinics, styrenic elastomers, or other stretchable fabrics or compressible elastic materials. For example, the backing layer can be constructed with a flexible thermoplastic while the projection layer is constructed with a cellular urethane.

In another embodiment the projections are constructed with multiple compressible elastic materials. For example, the bottom half of the projection is a harder material than the top half of the projection. This allows the projection to compress easily at low pressures while the bottom half of the projection is designed to support higher pressures.

Elastomeric Projections.

Figure 8:
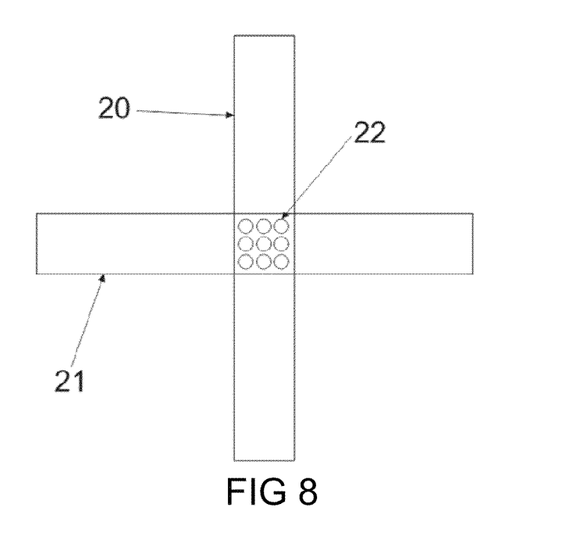
FIG. 8 is a top view illustrating a simple pattern of projections aligned with electrode rows and columns.

In one embodiment, the textured elastomer comprises a plurality of evenly spaced discrete projections. The projections are aligned with a sensor cell created by the intersection of an electrode column and an electrode row. For example, FIG. 8 illustrates a pattern of 3×3 projections aligned with a sensor cell where (20) is the flexible electrode column, (21) is the flexible electrode row, and (22) represents the alignment of the projections between the electrode layers. In one embodiment, each sensor cell comprises at least one projection, and may comprise a plurality of projections.

Figure 9:
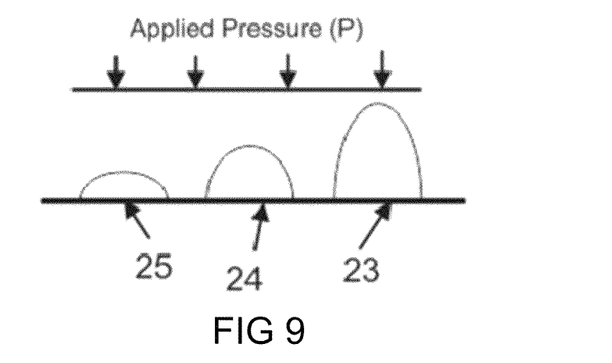
FIG. 9 is a cross-sectional view that illustrates the use of three different sized projections.

In one embodiment, the projections may be of varying dimensions, shapes and/or sizes. For example, the projects can be of two or more different heights and diameters. FIG. 9 illustrates an example of three different projection heights. As pressure is applied to the sensor, each individual projection will provide increasing resistance as the pressure is increased. For example, at low pressure only the highest projection (23) is engaged and will compress providing low pressure resistance. As pressure is increased, the middle projection (24) will begin to compress and provide additional resistance to the applied pressure. Similarly, as pressure continues to increase, the smallest projection (25) will provide further resistance. This construction increases low pressure sensitivity but allows higher pressures to be measured as well. If all projections were of equal height and had a hardness to support measurement of high pressures, then the low pressure sensitivity would be reduced by this construction. If all projections were of equal height and had a hardness to support measurement of low pressures, then the high pressure limit (i.e., dynamic range) would be significantly reduced by this construction.

In one example of projections of two different heights, the smaller projection can have a height that is 75% to 25%, or more preferably 50% less than the larger projection. In one example, the projections of varying height may be of different shape or geometry, or more preferably a scaled version of each other. In another example of projections of two different heights, the larger projection has a height in the range of 0.015" to 0.020", or more preferably 0.018", and the smaller projection has a height in the range of 0.005" to 0.013", or more preferably 0.009".

Another advantage of varying projection dimensions is that the height of the tallest projection can be reduced, resulting in a thinner, more compliant material. A taller projection allows for a greater range of compression and therefore a greater operational pressure range. Varying the projection dimensions can achieve the same range of compression with a lower maximum projection height.

The use of variable dimension projections on the projection layer results in improved sensitivity at both high and low pressures while reducing the thickness of the projection layer and the amount of elastomer material required for the projection layer. The use of different elastomer materials and variable projection dimensions has an added benefit of constructing a lighter and more flexible/compliant elastomer sheet.

In one embodiment, the projections may be of variable geometries. The projection geometry need not be restricted to a simple dome pattern as shown in FIG. 9. For example, elliptical, cylindrical, conical, rectangular, square, trapezoidal, pyramidal, triangular and other geometric shapes could be used to construct a textured elastomer sheet. The projection geometries may be uniform across the entire sheet or variable in the same manner that the projection dimensions can be variable.

Projection Patterns.

Figure 10A:
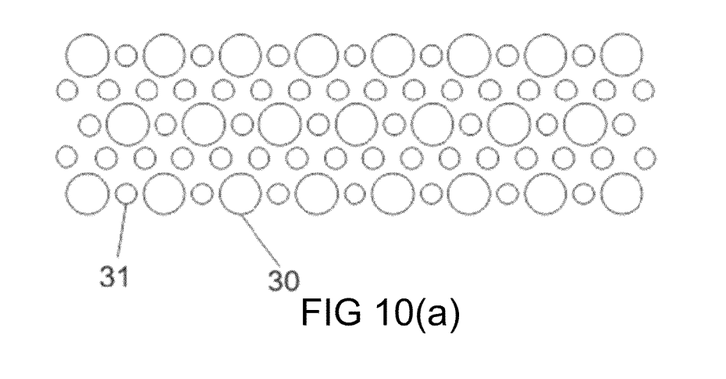
Figure 10B:
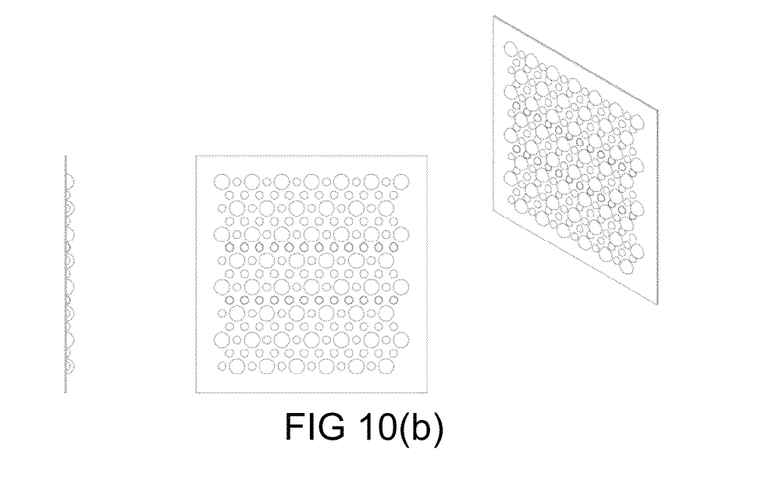

In one embodiment, the variable dimension projections are arranged in distinct patterns to increase the performance improvements that can be obtained from variable dimension projections. For example, FIG. 10 illustrates one possible pattern where larger projections (30) are interspersed with smaller projections (31) in a repeating pattern. There are numerous patterns that may be constructed using two or more projection dimensions.

Various patterns are possible. Consider first a situation where there are two types of projections: type A and type B. Type A and Type B are arranged in a regular pattern with Type A projections interspersed around the Type B projections. In one example, multiple Type A projections are placed in between the Type B projections on either the X or Y axis, or both. In another example, rows of Type A projections are placed between rows of Type B projections on either the X or Y axis, or both. The density of the Type A projection can be less than or greater than or equal to the density of Type B projections. For example, the Type A projection density is 200 to 300 projections per square inch and the Type B projection is 600 to 900 projections per square inch, or more preferably Type A projection density of about 250 projections per square inch and type B projection density of approximately 710 projections per square inch.

In one embodiment, the fill factor (percent of projection area to total area of the elastomer) ranges from 30% to 60%, or more preferably 40-50%. The fill factor indicates the amount of projection space to non projection space on the elastomer.

In one embodiment, the dimensions of the projections can be scaled to support various projection densities. For example, the projection density of Type A projections can be increased from 200 to 300 projections per square inch by 2 (400 to 600 projections per square inch), 3 (600 to 900 projections per square inch), or any other scaling factor. Similarly, the projection density of Type B projections can be increased from 600 to 900 projections per square inch by 2 (1200 to 1800 projections per square inch), 3 (1800 to 2700 projections per square inch), or any other scaling factor. Non-integer rational scaling factors can also be used, for example by 3/2, 4/3, 5/2, 5/3, 5/4, etc. A higher projection density reduces the impact of misalignment of the projections with the flexible row and column electrodes.

Figure 11:
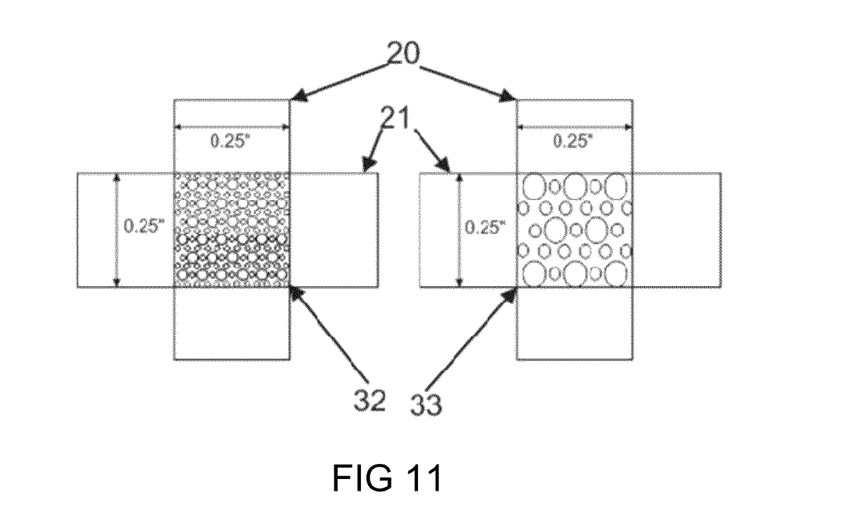
FIG. 11 are top views to two example patterns of projections with similar patterns but different densities.

In another example, the projection pattern shown in FIG. 10 can be scaled to support sensor cells of various sizes. FIG. 11 illustrates two possible patterns for a 0.25"×0.25" sensor cell. The higher density pattern (32) will have better performance but the lower density pattern (33) is less costly and easier to manufacture. Furthermore, the lower density pattern (33) will have acceptable performance for larger sensor cells, for example, a 1.25"×1.25" sensor cell. A higher density projection pattern has the added advantage of providing more support for the flexible electrode row (21) and column (20). When the larger projections are spaced too far apart the flexible electrode material can conform to the spaces between the projections and affect the measurement signal.

In one embodiment, the separation between projections can be varied to optimize performance. As projections are compressed they will expand into the free space between the projections and may interfere with adjacent projections. This interference reduces the compressibility of the projection as it no longer has free space to expand into. The spacing between variable size projections may vary in proportion to the projection size to optimize the interference characteristic. In another embodiment, the spacing between projections may be large enough to prevent interference. This construction is less suitable for high pressure applications but more suitable for applications that require greater sensitivity at low pressures.

In one applications, the use of different elastomer materials, higher density projection patterns and variable projection dimensions resulted in a threefold increase in dynamic range (minimum compression to maximum compression) compared to a design based on a single material and uniform projection dimension. It also further reduced the effects of creep, hysteresis, and compression set.

Textured Elastomer Manufacture.

The textured elastomer can be manufactured using a variety of printing techniques. For example, a 3 dimensional printer could be used to print the elastomer sheets. In another example, a custom mould could also be used to injection mould the elastomer sheets. Other commonly used printing techniques may also be used for construction.

Applications.

Pressure mapping devices are used in a wide variety of applications such as commercial and medical bed sensors; automotive, aviation and commercial seat sensors; wheelchair cushion and prosthetic sensors; automotive and industrial tire, windshield wiper, and door sensors, sporting and athletic equipment sensors, footwear and gait analysis sensors, to name a few. Additional applications include monitoring body surface pressure (both human and animals) for example to maximize comfort on support surfaces; prevent pressure ulcers through alerting, feedback systems, and adjusting mechanisms; optimize design and performance of machine and mechanical components, wheels, tires, rollers, blades, wipers, gaskets, seals, that interface; measurement of impact forces on support, protection, and restraint surfaces; measurement and monitoring of fluid pressure on lifting and propulsion systems, and fluid stream splatter and nozzle patterns. In many applications, there is generally a need for the pressure sensors to be as thin and flexible as possible while supporting measurement of a wide range of pressures. The textured elastomer designs described above provide improved performance with respect to the above mentioned pressure mapping applications while introducing long term measurement stability that enables continuous monitoring of support surfaces over extended periods of time.

What is claimed is:

1. A pressure mapping system comprising:
   a plurality of sensor cells created by intersections of electrode columns and rows, and
   a solid elastomer dielectric separating the electrode columns and rows and comprising at least one planar sheet having two major surfaces, wherein at least one major surface comprises a pattern of projections of at least two different types of projections, the different types of projections providing different resistances to compression from applied forces.

2. The system of claim 1, wherein the different types of projections include projections of different shapes.

3. The system of claim 1, wherein the different types of projections include projections of different sizes.

4. The system of claim 1, wherein the different types of projections include smaller projections of a height 50% less than that of larger projections.

5. The system of claim 1, wherein the different types of projections are constructed from different materials.

6. The system of claim 1, wherein the different types of projections are interspersed.

7. The system of claim 1, wherein the number of projections per unit area is different for different types of projections.

8. The system of claim 1, wherein a density of one of the types of projections is within a range from 200 to 300 projections per square inch.

9. The system of claim 1, wherein a density of one of the types of projections is within a range from 1800 to 2700 projections per square inch.

10. The system of claim 1, wherein the solid elastomer dielectric has a hardness within a range from 30 Shore A to 70 Shore A.

11. The system of claim 1, wherein the solid elastomer dielectric comprises a backing layer.

12. The system of claim 11, wherein the backing layer is constructed from a harder material than a material used to construct the projections.

13. The system of claim 12, wherein the backing layer has a hardness within a range from 5 Shore A to 50 Shore A.

14. The system of claim 11, wherein the backing layer is constructed from a material that has a greater elasticity than a material used to construct the projections.

15. The system of claim 11, wherein the backing layer is constructed from a flexible thermoplastic and the projections are constructed from a cellular urethane.

16. The system of claim 1, wherein the projections are constructed from different materials in different regions of the pressure mapping system.

17. The system of claim 1, wherein the pressure mapping system is capable of mapping pressure over an area within a range from 12 inch×12 inch to 24 inch×24 inch.

18. The system of claim 1, wherein the pressure mapping system is capable of mapping pressure over an area within a range from 28 inch×72 inch to 40 inch×96 inch.

19. The system of claim 1, wherein the projections occupy an area that is from 30% to 60% of the area over which the pressure mapping system is capable of mapping pressure.

20. The system of claim 1, wherein sensor cells have different areas.

21. The system of claim 1, wherein sensor cells have areas within a range from 1 inch×1 inch to 2 inch×2 inch.

22. The system of claim 1, wherein the sensor cells have areas within a range from 0.25 inch×0.25 inch to 0.75 inch×0.75 inch.

23. The system of claim 1, wherein the solid elastomer dielectric has a thickness within a range from 0.05 inches to 0.2 inches.

24. The system of claim 1, wherein the solid elastomer dielectric has a thickness within a range from 0.002 inches to 0.025 inches.

25. The system of claim 1, wherein the pressure mapping system is capable of mapping pressures within a range from 5 mmHg to 200 mmHg.

26. The system of claim 1, wherein the pressure mapping system is capable of mapping pressures within a range from 0.1 psi to 15 psi.

27. The system of claim 1, wherein the pressure mapping system is capable of mapping pressures within a range from 10 psi to 200 psi.

28. The system of claim 1, wherein the solid elastomer dielectric is textured.

29. The system of claim 1, wherein the planar sheet is flexible.

* * * * *